United States Patent [19]

Hanley

[11] Patent Number: 4,809,879

[45] Date of Patent: Mar. 7, 1989

[54] METHOD AND APPARATUS FOR DISPENSING ITEMS

[75] Inventor: James O. Hanley, Minnetonka, Minn.

[73] Assignee: Tifcor Corporation, Los Angeles, Calif.

[21] Appl. No.: 913,725

[22] Filed: Sep. 30, 1986

[51] Int. Cl.[4] .............................................. B65G 59/00

[52] U.S. Cl. ................................ 221/125; 221/150 R; 221/152; 221/194; 221/251; 221/255; 221/289

[58] Field of Search ........... 221/125, 123, 124, 150 R, 221/151, 152, 154, 191, 194, 195, 251, 255, 256, 263, 266, 269, 92, 245, 289

[56] References Cited

U.S. PATENT DOCUMENTS

| | | | |
|---|---|---|---|
| 2,260,643 | 10/1941 | Rosan . | |
| 2,304,455 | 12/1942 | Guerard, Jr. | 312/48 |
| 2,493,223 | 1/1950 | Brock | 312/48 |
| 2,521,458 | 9/1950 | Huheey et al. | 221/125 |
| 2,990,227 | 6/1961 | McCaleb | 312/35 |
| 3,146,907 | 9/1964 | Bookout | 221/67 |
| 3,174,646 | 3/1965 | Johnson | 221/129 |
| 3,286,880 | 11/1966 | Gross | 221/82 |
| 3,390,754 | 7/1968 | Newberry | 221/125 X |
| 3,737,071 | 6/1973 | Offutt et al. | 221/129 |
| 3,795,345 | 3/1974 | Baxendale | 221/125 |
| 4,094,440 | 6/1978 | Lotspeich | 221/12 |
| 4,146,122 | 3/1979 | Harris | 221/154 X |
| 4,171,752 | 10/1979 | Pertinen | 221/84 |
| 4,368,829 | 1/1983 | Lotspeich et al. | 221/75 |
| 4,436,194 | 3/1984 | Hanley | 194/63 |
| 4,570,821 | 2/1986 | Holland et al. | 221/194 |

FOREIGN PATENT DOCUMENTS

| | | | |
|---|---|---|---|
| 2132178 | 7/1984 | United Kingdom | 221/125 |

*Primary Examiner*—Joseph J. Rolla
*Assistant Examiner*—David H. Bollinger
*Attorney, Agent, or Firm*—Merchant, Gould, Smith, Edell, Welter & Schmidt

[57] ABSTRACT

Method and apparatus for dispensing items are disclosed. A preferred dispenser (20) according to the invention includes a vend unit (24) suitable for placement in a small (e.g., four cubic feet) refrigerator (22). The vend unit (24) is preferably an all-mechanical device including a coin receiver mechanism (30) operatively coupled to four delivery doors (26) and associated levers (28). Upon insertion of the proper coinage within coin receiver mechanism (30), and movement of one of the levers (28), an associated slide member (54,56) is caused to move. This in turn enables one of the doors (26) to open, allowing access to an item from the selected group. When one of the slide members (54,56) moves, movement of the remaining slide members (54,56) is precluded by blocking pivots (90,162).

5 Claims, 6 Drawing Sheets

METHOD AND APPARATUS FOR DISPENSING ITEMS

FIELD OF THE INVENTION

The invention relates generally to methods and apparatus for dispensing items, and more particularly to coin-responsive vending machines suitable for dispensing articles of merchandise such as beverage cans

BACKGROUND OF THE INVENTION

Dispensing articles of merchandise, e.g., packaged snacks and beverages, in reliable, cost-effective fashion is a long-standing problem. Coin-operated vending machines are commonly used to dispense such articles, and the present invention is directed toward such machines Most vending machines are large, complicated, electrically-operated, and dependent upon relatively large sales volume. Therefore, small shops, factories, offices, and the like, which have a relatively small work force, are at a disadvantage because the volume of business does not justify the installation of one of the expensive vending machines commonly available. In view of this, there is a need for a reliable, relatively inexpensive, pilferage-resistant vending machine for dispensing articles of merchandise, e.g., beverage cans. Preferably, such a machine is also compact enough to sit atop a counter or within a small refrigerator.

The present invention addresses the problems associated with reliable, cost-effective vending of articles of merchandise. A particularly important feature of the present invention is a lock-out mechanism which permits the vending of only a single item after the proper deposit of coinage in the machine. Access to any other than the item purchased is effectively prevented.

SUMMARY OF THE INVENTION

In broad terms, the invention includes an apparatus for dispensing items (e.g., beverage cans), including:

(a) supply means for providing a plurality of groups of items;

(b) means in operative contact with the supply means for selecting each of the groups of items; and (c) delivery means in operative contact with the selecting means for allowing access to an item from the selected group, wherein the selecting means comprises:

- (i) a plurality of slide members in operative contact with the supply means, one each of the slide members being associated with one each of the groups of items, wherein when one of the slide members is activated an item from the selected group is made available at the delivery means;
- (ii) means for enabling activation of the slide members; and
- (iii) lock-out means for ensuring that only one of the slide members can be activated at a time.

The "supply means" can include a frame having a plurality of inclined tracks suitable for holding the items to be dispensed.

Also, in preferred embodiments the "delivery means" includes a plurality of delivery doors, one each of the delivery doors being associated with one each of the slide members, wherein each delivery door is unlocked upon activation of the associated slide member.

The "lock-out means" preferably includes one or more blocking pivots suitable for contact with the slide members, wherein upon activation of the selected slide member the blocking pivots prevent activation of the other slide members.

The "selecting means" preferably includes a plurality of lever-operated cams, whereby the slide members can be independently activated by appropriate manipulation of the levers.

The "enabling means" preferably includes a cockable latch plate having an unactivated state and an activated state. When the latch plate is in its unactivated state, it prevents movement of the slide members and thereby maintains the delivery doors in their locked states. When the latch plate is cocked, it enables movement of the slide members and the associated delivery doors The "enabling means" also preferably includes a spring-loaded latching member suitable for cocking the latch plate The latching member preferably includes means for preventing activation of the slide members during the cocking process.

The "enabling means" further preferably includes a coin receiver mechanism which, when supplied with the proper coinage, and appropriately manipulated, can cause the latching member to cock the latch plate.

The "delivery means" preferably includes means for retaining all but one of the items in the selected group of items. Preferably, the "retaining means" includes a plurality of pivotable flaps, one each of the flaps in operative proximity or contact with one each of the slide members, wherein when a selected slide member is activated the associated flap permits only one of the items from the selected group to be withdrawn.

A preferred dispenser is refrigerated and is suitable for vending canned beverages.

BRIEF DESCRIPTION OF THE DRAWING

The invention will be further described with reference to the Drawing wherein.

DETAILED DESCRIPTION OF THE INVENTION

Figure 1:
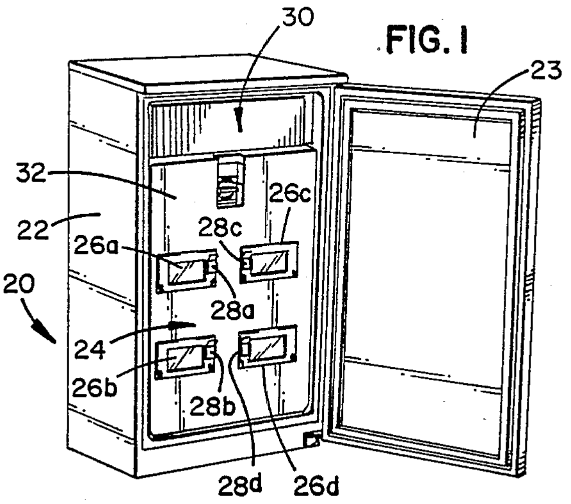
FIG. 1 is a perspective view of a dispenser according to the invention.

With reference to the Drawing, wherein like reference numerals represent like parts and assemblies throughout the several views, FIG. 1 shows a perspective view of a preferred dispenser 20 according to the invention. The invention will be described with reference to the dispensing of canned beverages of one or more flavors in cylindrically shaped containers, but it will be understood that the invention is equally applicable to dispensing other articles of merchandise, such as other canned goods, bottled goods, packaged goods of various types, and other articles or products preferably, though not necessarily, cylindrical in shape.

Dispenser 20 preferably includes a relatively small, e.g., four cubic feet, refrigerator 22 having a door 23. Such small refrigerators are manufactured by Sanyo and others and are readily available. It is important that the door 23 have a flush inner surface to accommodate a "vend unit", described below. The refrigerator 22 houses a vend unit 24 which is suitable, for example, for accepting coins and, in response, dispensing 12 ounce or 8 ounce canned beverages. In a preferred embodiment, the vend unit 24 includes four delivery doors **26*a*–*d*** which include central transparent windows for displaying the canned beverages so that the consumer may know that product is available and view the variety of beverages before making his selection.

The vend unit 24 also includes a plurality of levers **28*a*–*b* equal in number and adjacent to the delivery doors 26*a*–*d*. A coin receiver mechanism 30 is positioned toward the top of the vend unit 24. Coin receiver mechanism 30 is preferably similar to that disclosed in U.S. Pat. No. 4,436,194, issued to the applicant herein. As further described below, a central portion of coin receiver mechanism 30** can be rotated upon insertion of the proper coinage to initiate a vend cycle.

Enclosing the front surface of the vend unit 24 is a vend unit door 32 which is preferably formed from light weight gauge steel and is lockable using a standard key lock (not shown).

Preferably, the vend unit 24 is exclusively a mechanical device which can be readily inserted into a standard refrigerator 22. That is, preferred embodiments of the vend unit 24 do not include electrical components which would potentially require wiring by an electrician and which could make for a complicated, expensive dispenser. In keeping with this objective, vend unit 24 preferably includes a unique, compact, mechanical (only) lock-out mechanism 34 shown in the Drawing.

Figure 5:
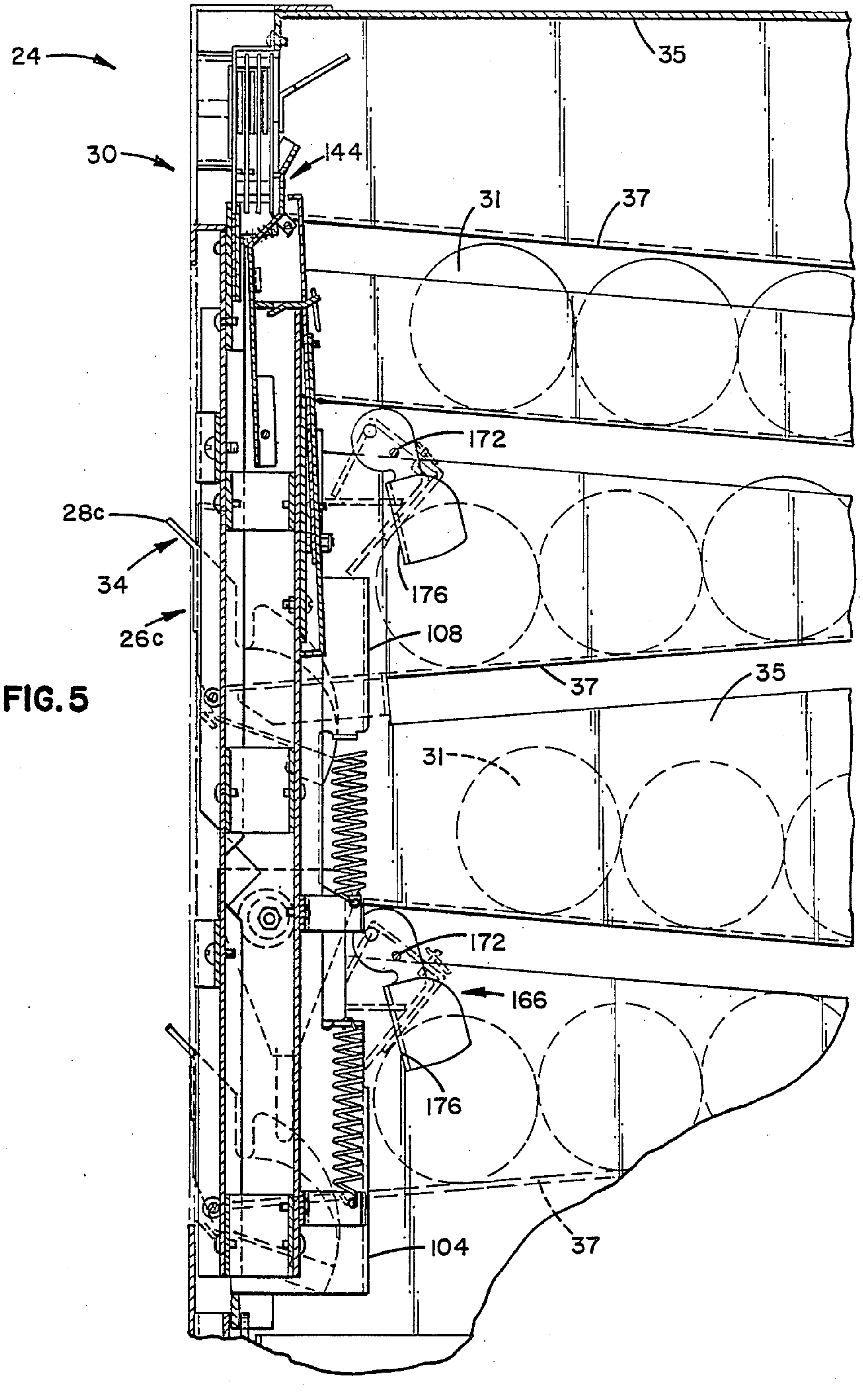
FIG. 5 is a sectional view of the entire vend unit of the dispenser of FIG. 1, including the lock-out mechanism.

Lock-out mechanism 34 is supported by a vend unit frame 35 which preferably supports or forms inclined tracks 37 suitable for appropriately storing canned beverages 31 to be dispensed (see FIG. 5). The inclined tracks 37 slope upwardly from the delivery doors **26*a*–*d* and are of sufficient width to allow the beverage cans to be stacked one behind the other such that the cans roll down the tracks toward the delivery doors 26*a*–*d*. . As shown in FIG. 5, beverage cans 31 are loaded at the front of the vend unit 24 and follow a zigzag path down from their inlets to their discharge ends proximate the delivery doors 26*a*–*d*.**

Lock-Out Mechanism 34

The lock-out mechanism 34, as further described below, is operatively connected to the doors **26*a*–*d* and the levers 28*a*–*d* and serves to permit only one delivery doors 26*a*–*d* to be opened during a given vend cycle as initiated, preferably, by inserting the proper coinage within coin receiver mechanism 30. That is, mechanism 34 "locks out" all but the selected door 26*a*–*d* so that only one can 31** is accessible per vend cycle.

Referring to FIGS. 2 through 5, lock-out mechanism 34 is an elongate mechanism having a stationary frame consisting of a pair of side panels 40; a front panel 42; and a back panel 44. The lock-out mechanism panels 40, 42, 44, like all of the planar components of lock-out mechanism 34, are formed of light gauge galvanized or stainless sheet steel, preferably 0.030 inch thick. They are riveted together to form a vertical elongate channel having a substantially square cross section and running substantially the entire length of lock-out mechanism 34. The lock-out mechanism front panel 42 carries a pair of metal brackets 46 which allow it to be connected to vend unit frame 35 using conventional connectors.

Front panel 42 carries a U-shaped bracket 48 at its upper end suitable for slidably receiving the coin receiver mechanism 30. In addition, the lock-out mechanism frame made up of panels 40, 42 and 44 supports the moving parts of the lock-out mechanism 34. When the proper coinage is inserted into the coin receiver mechanism 30 and the movable portion of the mechanism is rotated, the coins fall down through the substantially hollow lock-out mechanism frame and into a lockable coin box (not shown) hidden behind vend unit door 32.

As noted above, the framework of the lock-out mechanism 34 is in part comprised of a pair of side panels 40. Immediately adjacent to each side panel 40 is an elongate member or lower door slide 54. As its name suggests, lower door slide 54 is configured to slide relative to the stationary framework of lock-out mechanism 34. As also suggested by its name, the lower door slide 54 has a unique functional relationship to the adjacent lower delivery door **26*b* or *d*.**

Lying atop each lower door slide 54 is an elongated member or upper door slide 56. Thus, the lower door slides 54 are sandwiched between the upper door slides 56 and the lock-out mechanism side panels 40. Further, associated door slides 54 and 56 can independently slide in a vertical direction relative to the side panels 40. The door slides are substantially planar with the exception of certain flanges and tabs, described below. They are preferably stamped out of light gauge sheet steel.

Associated door slides 54 and 56 are constrained to move vertically by an anti-tamper L-shaped bracket 58 located near the top of the lock-out mechanism 34, and a slider washer 60 located toward the bottom of associated slides 54 and 56. Brackets 58 and washers 60 are connected by standard screws or studs to the side panels 40 so that associated door slides 54 and 56 are loosely and slidably confined. The screws or studs which support the anti-tampering brackets 58 fit within vertical slots 76 and 78 formed in the door slides 54 and 56, respectively, toward their upper ends. Similarly, the screws or studs which engage washers 60 are received by vertical slots formed by slides 54 and 56, respectively. Finally, lower slides 54, only, form vertical slots 72 toward their lower ends which receive and are guided by studs 84.

As further described below, the slides 54 and 56 are very important components of mechanism 34. The normal or "unactivated" positions (prior to a vend cycle) of slides 54 and 56 are shown in FIGS. 2 through 5. They are urged toward these positions by a pair of lower slide extension springs 62 and a pair of upper slide extension springs 64, shown best in FIG. 4. The lower springs 62 extend from a lower spring bracket 66 to lower spring tabs 67 extending inward from and perpendicular to the generally planar lower door slide 54. Similarly, upper slide springs 64 span between an upper spring bracket 68 attached to the back panel 44 and upper spring tabs 69 extending inwardly from and perpendicularly to the generally planar upper door slides 56.

Pivotally mounted to each lockout mechanism side panel 40 is an upper/lower blocking pivot 90. Each pivot 90 is generally in the shape of an isosceles triangle, and pivots about stud 84 located in the lower corner of the triangle at the intersection of the equilateral sides of the triangle. As noted above, lower slides 54 form slots 72 to receive the studs 84. In the upper corners of the substantially triangular upper/lower blocking pivots 90 are pivot pins 92 which extend inwardly, perpendicular to the side panels 40. Notches or cutouts are provided in the side panels 40 so that upper/lower blocking pivots 90 can pivot about studs 84 when the pins 92 are contacted by the lower or upper slides 54 or 56, respectively.

Figure 9:
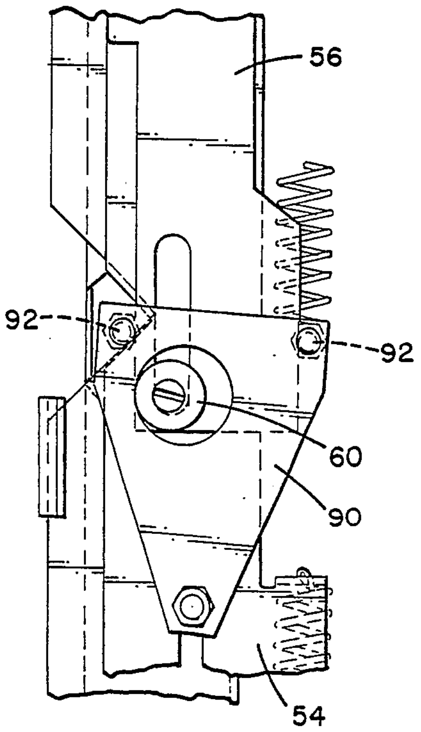
FIG. 9 is a partial elevational view of the lower portion of the lock-out mechanism of FIG. 2, showing the operation of the upper/lower blocking pivot upon activation of one of the upper door slide members.
Figure 11:
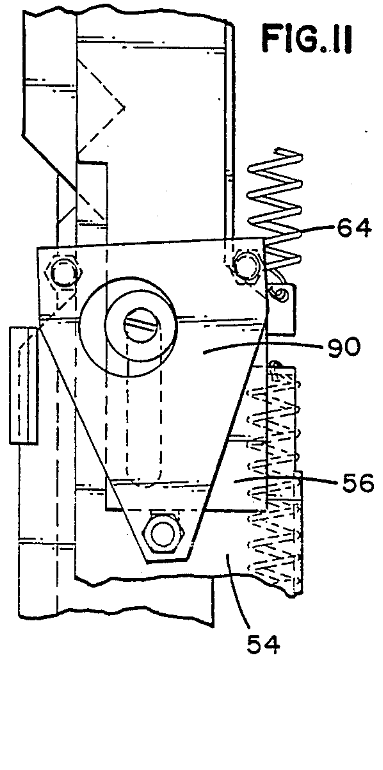
FIG. 11 is a partial elevational view of the lower portion of the lock-out mechanism of FIG. 2, showing the operation of the upper/lower blocking pivot upon activation of one of the lower door slide members.

The lower slides 54 are notched to form inclined surfaces which are substantially at 45 degree angles relative to the vertical side edges of the lower slides 54. The inclined surfaces can contact the forwardmost pins 92 on the upper/lower blocking pivots 90 so as to draw the blocking pivots 90 toward the front of the lock-out mechanism **34*a* (blocking pivot 90 would, for example, pivot in a counter-clockwise manner, as viewed in FIG. 2). In like manner, upper slides 56 are cut so as to form inclined surfaces 98 which, when they contact rearmost pins 92, tend to rock the upper/lower blocking pivots 90 toward the back panel 44 of mechanism 34 for example (causing blocking pivot 90 to rock in a clockwise manner, as viewed in FIG. 2). Thus, when one of the lower slides 54 is raised, the associated upper/lower blocking pivot 90 pivots forwardly about stud 84, and the spacing between pins 92 is such that this prevents the adjacent upper slide 56 from moving. Conversely, if the upper slide 56 is moved upward, the adjacent lower slide is blocked by the associated upper/lower blocking pivot 90. Further, associated upper and lower slides 56 and 54 cannot simultaneously move upward due to the spacing between pins 92: only one of the adjacent slides 54 or 56 can move at one time due to the blocking action of blocking pivot 90. In other words, if one of the slides 54 or 56 on one side of mechanism 34 is raised, the associated other slide is "locked out". FIG. 9 shows the blocking action of pivot 90 on the associated slide 54 when one of the top doors 26*a* or c is opened. Similarly, FIG. 11 shows the slide 56 being blocked by pivot 90 when one of the lower doors is opened. As noted above, there is an upper/lower blocking pivot on each side of mechanism 34, one for each set of adjacent slide members 54 and 56**.

Figure 6:
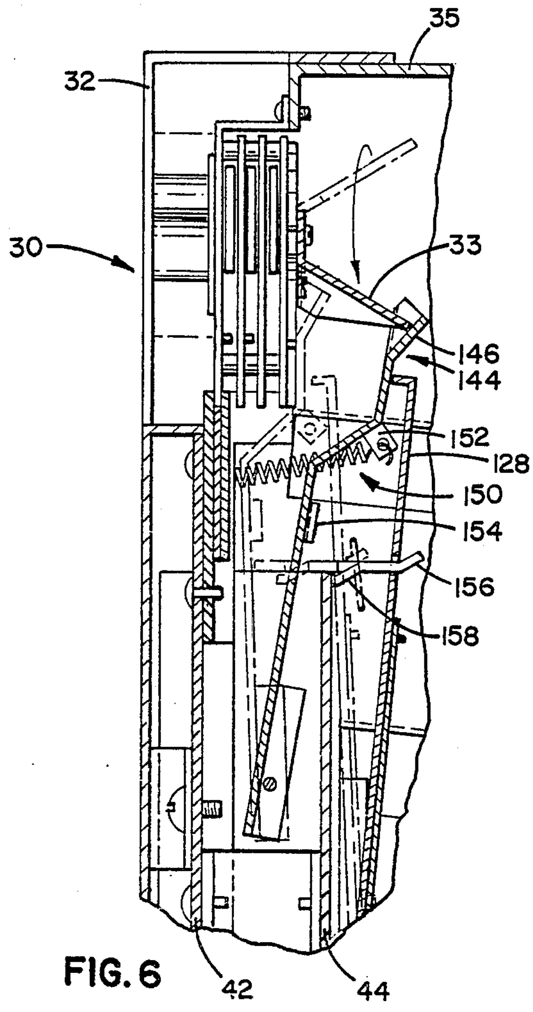
FIG. 6 is a sectional view of the top portion of the lock-out mechanism of FIG. 2, showing cocking of the latch plate.
Figure 2:
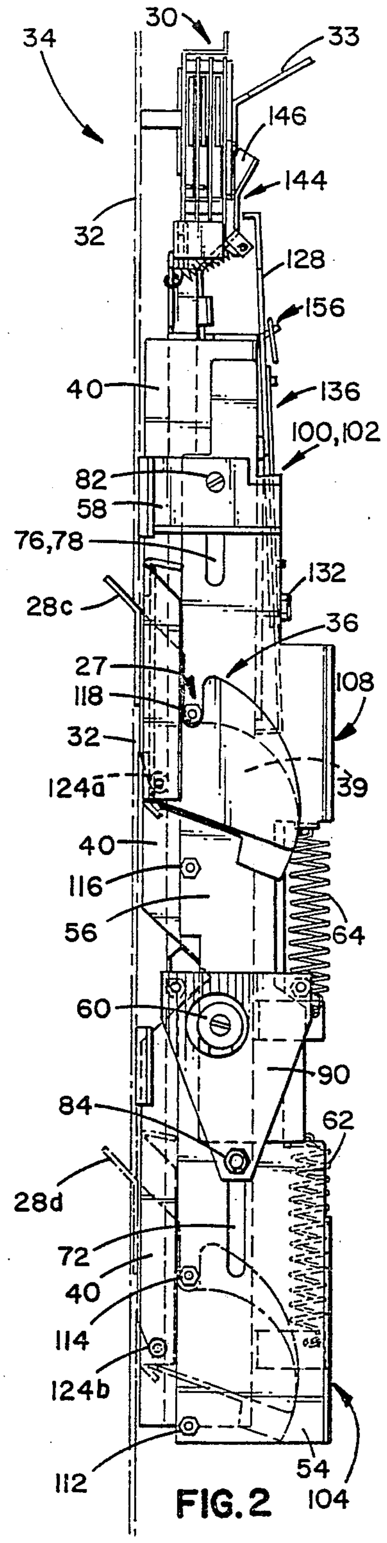
FIG. 2 is a side elevational view of the lock-out mechanism of the dispenser of FIG. 1.
Figure 3:
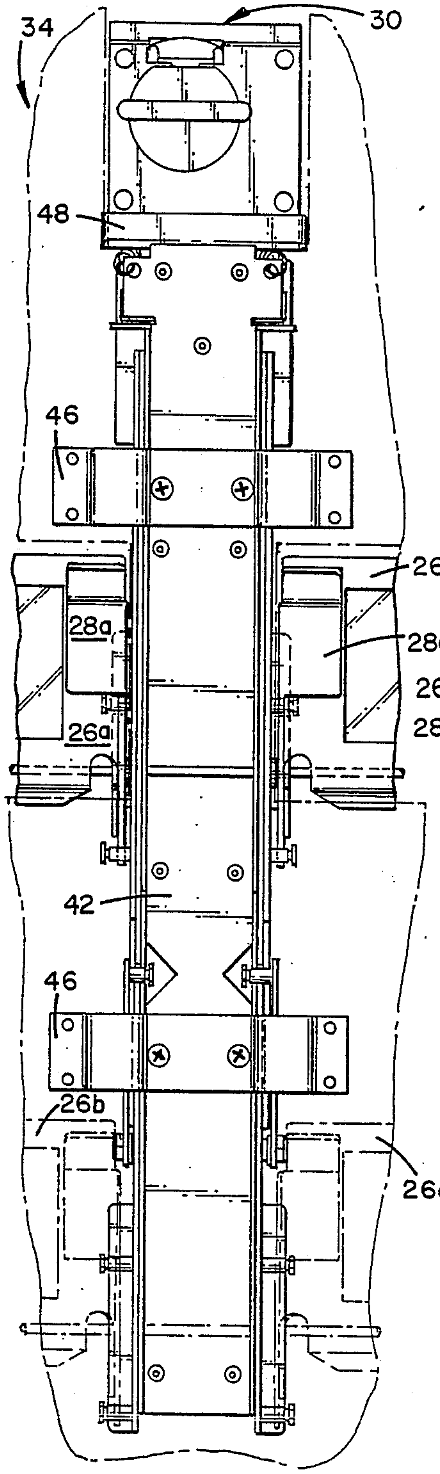
FIG. 3 is a front elevational view of the lock-out mechanism of FIG. 2.
Figure 4:
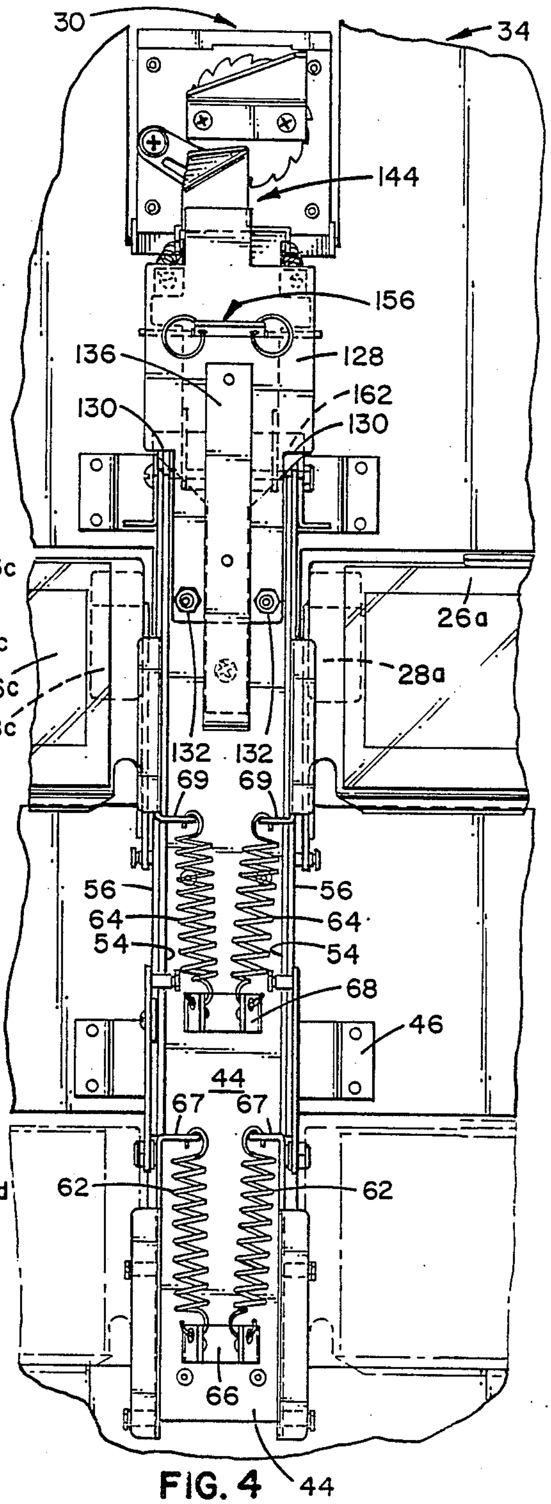
FIG. 4 is a rear elevational view of the lock-out mechanism of FIG. 2.

As perhaps best shown in FIGS. 4 and 6, connected to the back panel 44 is a substantially planar latch plate 128. A pair of studs 132 hingedly connect latch plate 128 to back panel 44 such that latch plate 128 can pivot away from its normal, substantially parallel relationship with respect to back panel 44. A latch plate flat spring 136 connected to latch plate 128 and engaging back panel 44 urges latch plate 128 toward a parallel relationship with back plate 44. Latch plate 128 forms a pair of downwardly-facing horizontal latch plate catches 130 at its side edges. The slides 54 and 56 also form upwardly-facing substantially horizontal catches or notches 100, 102. The catches or notches 130 are, in effect, lateral extensions of the latch plate 128 suitable for "catching" or stopping the catches 100, 102 on slides 54 and 56 when the latch plate 128 is in its normal position, as shown in FIG. 2, for example. All slides 54 and 56 will be "caught" by latch plate 128 unless the latch plate 128 is pivoted away from the back panel 44 or cocked, as shown in FIG. 6.

The latch plate 128 can be cocked or suitably held away from back panel 44 by a latching member 144 which is pivotally connected to side panels 40, as best shown in cross section in FIG. 6. Latching member 144 includes, at its upper end, an inclined flange 146 which can be engaged by another inclined flange 33 attached to the rotary portion of the coin receiving mechanism 30. A pair of extension springs 150 extend from the front panel 42 to a pair of latching member tabs 152. Extending laterally from the main portion of the latching member 144 are a pair of latching member ears 154 which come into vertical alignment with the top surfaces of the slides 54 and 56 when the latching member 144 is pivoted away from the coin receiving mechanism 30 during the cocking or latching operation.

Figure 8:
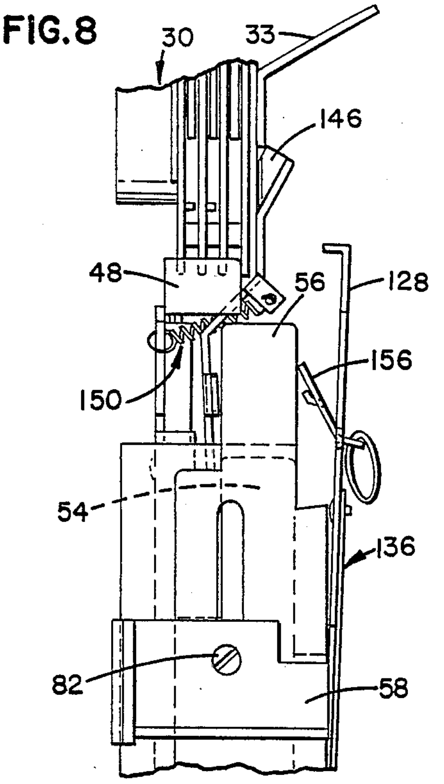
FIG. 8 is a partial elevational view of the upper portion of the lock-out mechanism of FIG. 2, showing activation of the slide member associated with one of the top delivery doors.
Figure 10:
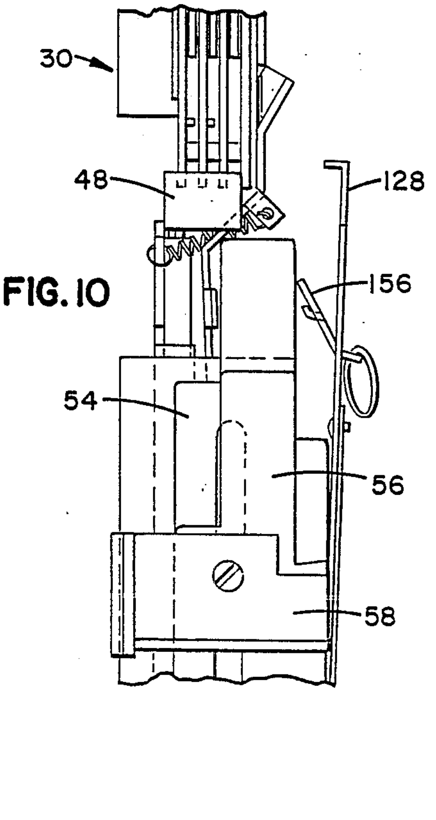
FIG. 10 is a partial elevational view of the upper portion of the lock-out mechanism of FIG. 2, showing activation of the slide member associated with one of the bottom delivery doors.
Figure 12:
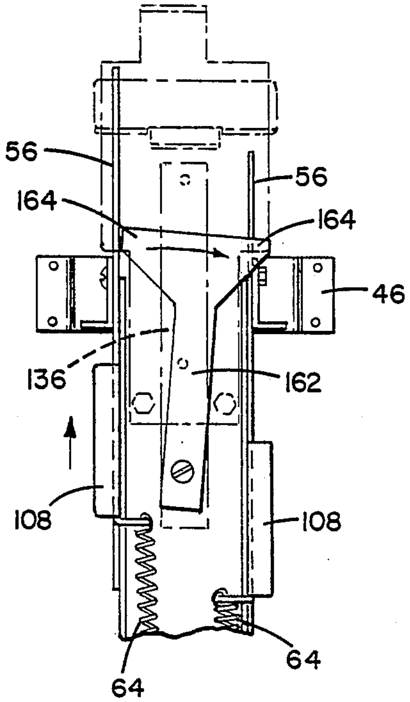
FIG. 12 is a broken-away rear elevational view of the lock-out mechanism of FIG. 2, showing activation of one of the right doors and the effect on the right/left blocking pivot.
Figure 13:
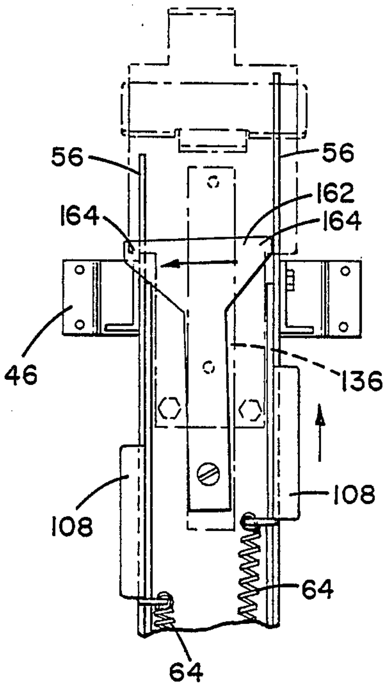
FIG. 13 is a broken-away rear elevational view of the lock-out mechanism of FIG. 2, showing activation of one of the left doors and the effect on the right/left blocking pivot.

Loosely hinged to and extending forwardly from the latch plate 128 is a latching flap 156. Latching flap 156 is loosely hinged to the latch plate 128 and includes a latching flap notch 158 jutting downwardly from the main plane of the latching flap 156, as shown in FIG. 6. When the latching member 144 urges the latch plate 128 away from the back panel 44 to a sufficient degree, the notch 158 will engage the back panel 44 and hold the latch plate 128 in a cocked position (shown in FIG. 6), until one of the slides 54, 56 pushes the flap 156 upward to release the notch 158 from the back panel 44. When latch plate 128 is in its cocked position, the catches 100, 102 on the slides 54, 56 will not engage the corresponding catches 130 formed by the latch plate 128. Thus, any of the slides 54, 56 can proceed upward when the plate 128 is cocked, as shown in FIGS. 8 and 10. However, as noted above, the pivots 90 prevent associated upper and lower slides 56 and 54 from being simultaneously activated. In addition a left/right blocking pivot 162 prevents doors on the left and right of mechanism 34 from being simultaneously opened, as shown in FIGS. 12 and 13. The left/right blocking pivot 162 is a substantially T-shaped flat member which is pivotally pinned to the rear panel 44. The T-shaped blocking pivot 162 is mounted in vertical fashion such that the top of the "T" is proximate the coin responsive unit 30. A pair of blocking pivot ears 164 extend laterally from the blocking pivot 162 at its top end and these pivot ears 164 have inclined surfaces at their lower edges suitable for engaging catches 100, 102 on slides 54, 56. When any one of the slides 54, 56 is moved upward, it engages the corresponding pivot ear 164 so as to pivot or rock the T-shaped blocking pivot 162 away from the upwardly traveling slide to block the slides 54, 56 on the other side of the mechanism 34. Further, as in the case of the upper/lower pivots 90, the spacing between ears 164 is such as to prevent simultaneous activation of slides on the left and right sides. Thus, the blocking pivot 162 serves to allow only one side of the mechanism 34 to operate during a given vend cycle. In combination, then, pivots 90 and 162 comprise a lock-out mechanism which allows only one slide 54 or 56 to be activated during a given vend cycle.

Associated with each slide 54, 56 is a delivery door 26*a–d* and a delivery lever 28*a–d*. Doors 26*a* and 26*c*, and corresponding levers 28*a* and 28*c* are horizontally aligned and are commonly rotatably pinned by a relatively long, round pin 124*a*. Similarly, doors 26*b* and 26*d* and levers 28*b* and 28*d* commonly pivot about an elongate pin 124*b*. Pins 124*a*, *b* extend through apertures formed in side panels 40 of mechanism 34. Pins 124*a*, *b* also extend through apertures formed in the vend unit frame 35.

Extending outwardly and perpendicular to each upper slide 56 is an upper slide upper pin 118 and an upper slide lower pin 116, pins 116 and 118 being vertically aligned. In like manner, each lower slide 54 has extending from it, and perpendicular thereto, a lower slide upper pin 114 and a lower slide lower pin 112. As further described below, the upper pins 114 and 118 are particularly important: normally, when a vend cycle is not occurring, pins 118 and 114 will reside in slots 27 formed in surfaces 38 of doors 26*a–d* which are parallel to the side panels 40. The pins 118 and 114 do not allow a door 26 to open unless the appropriate slide 54, 56 is vertically raised to a sufficient degree. Lower pins 112 and 116 force their corresponding doors to open as the corresponding slides 54 and 56, respectively, are raised. Pins 112 and 116 engage the lower edges of surfaces 38 to open the doors 26*a–d*.

Like doors 26*a–d* levers 28*a–d* include surfaces 39 which are parallel to the side panels 40. These surfaces 39 form, at their upper edges, curvilinear cam surfaces 29 suitable for operative contact with pins 118 and 114. The upper edges 36 of surfaces 38 of doors 26*a–d* also form curvilinear cam surfaces 36 suitable for engagement with the pins 118 and 114. Cam surfaces 36 contact the pins 118 and 114 after the doors 26*a–d* are unlocked, thereby causing the spring-loaded doors 26*a–d* to smoothly open as the pins 114 and 118 are raised.

Returning again to the structure of the slides 54, 56, extending outwardly and substantially perpendicular to the major planar surfaces of the upper slides 56 are vertical upper flanges 108 located proximate rear panel 44. Similarly, vertical flanges 104 extend outwardly from lower slides 54 proximate the rear panel 44. The flanges 104 and 108 are substantially parallel to the back panel 44 of mechanism 34. Also, since flanges 104 and 108 are integral portions of slides 54 and 56, they move in conjunction with pins 114 and 118, respectively.

Entire Vend Unit 24

Figure 7:
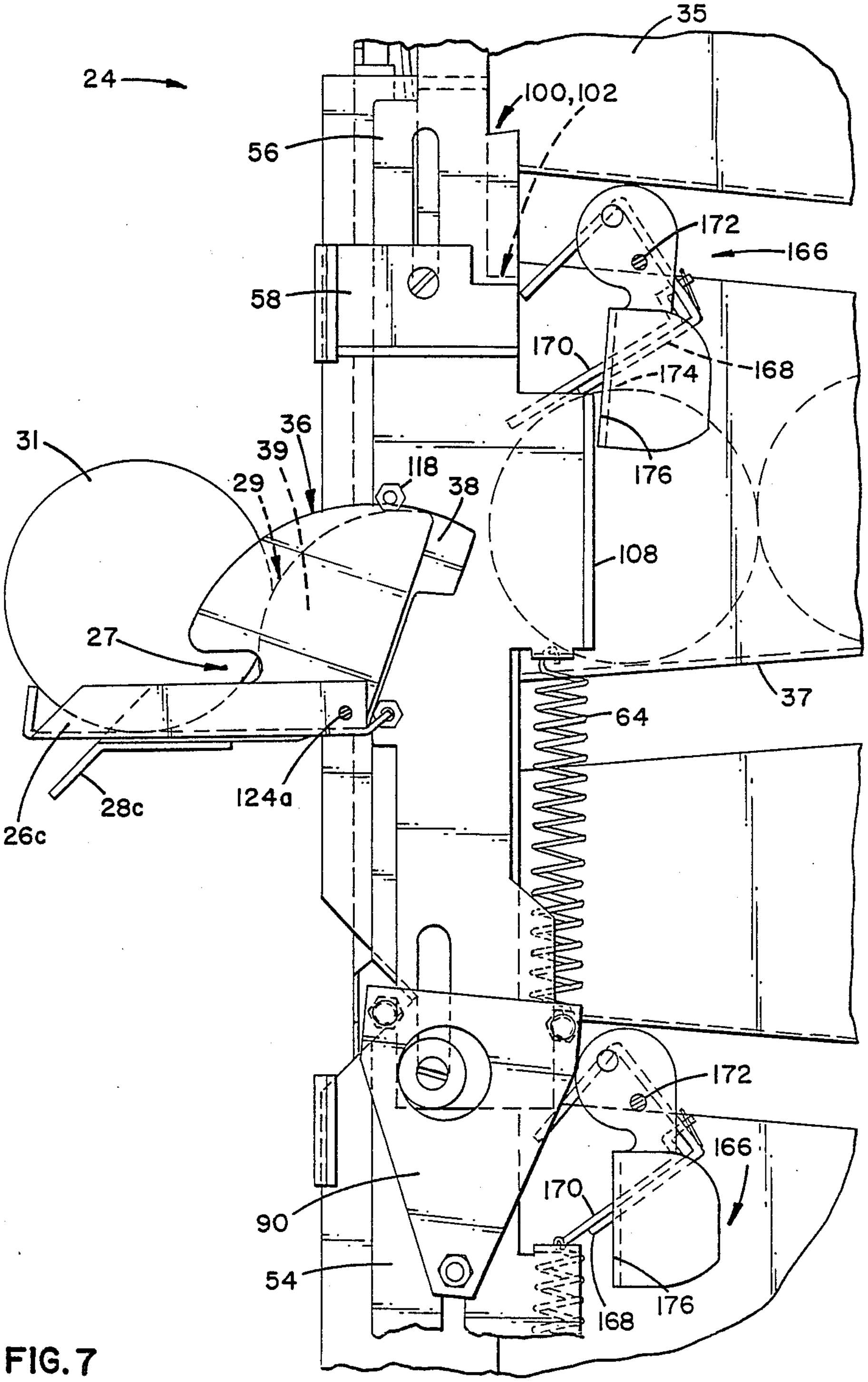
FIG. 7 is a side elevational view of the vend unit of the dispenser of FIG. 1, showing the dispensing of a beverage can.

Having structurally described the lock-out mechanism 34, attention is turned to FIGS. 5 and 7 which show longitudinal views of the entire vend unit 24, including the vend unit frame 35. The vend unit frame 35 carries a plurality of can retention members 166 which are horizontally pivotally mounted to the frame 35 .using elongate round retention pins 172. Associated with each delivery door 26*a–d* is a can retention member 166, wherein the function of the can retention members is to allow cans 31 to proceed into the delivery areas only when the doors 26*a–d* are closed. Each can retention member 166 includes a rigid flap 168 which normally angles downward roughly at an angle of 45 degrees to the horizontal. Loosely hinged so as to normally lie atop each rigid flap 168 is a flexible flap 170 which is longer and extends downward to a greater degree than the associated rigid flap 168, as shown in FIG. 7. Each can retention member 166 also includes, in a plane substantially perpendicular to pin 172 and flaps 170 and 168, a retention member extension 174 which has a surface toward its front end which is normally roughly parallel to the front panel 42 of mechanism 34. The retention members 166 can pivot to allow cans 31 to proceed into the delivery area, and are weighted and mounted such that they return to the positions shown in FIGS. 5 and 7 following passage of a can 31.

The front surfaces 176 of retention member extensions 174 are normally (not during a vend cycle; see FIG. 5, for example) out of horizontal alignment with flanges 104 and 108 so that retention members 166 can freely pivot (in a clockwise direction in FIG. 5) so as to raise rigid flaps 168 to permit cans to proceed into the delivery areas. However, as shown in FIG. 7, when one of the slides 54, 56 is raised, its flange 104 or 108 comes into vertical alignment with the corresponding- retention member extension 174 to preclude access to more than one can at the associated door 26*a–d*.

SUMMARY OF OPERATION

While the function of many, if not all, of the components is described above, a summary of the operation of the entire dispenser 20 is in order. When it is desirable to dispense a beverage, the refrigerator door 23 is opened and appropriate coinage is placed in coin receiving mechanism 30. Armed with the appropriate coinage, the rotating portion of the mechanism can indeed be rotated relative to the stationary portion supported by the frame of mechanism 34. During rotation of the rotary portion the coins eventually fall down through the substantially square channel formed by panels 40, 42, 44 and 46 of mechanism 34 and into a coin box (not shown). Also, angled flange 33 of coin mechanism 30 engages flange 146 on latching member 144 to cause it to pivot away from the front panel 42, the springs 150 extending to permit this response. The latching member 144 contacts latch plate 128 and causes it and latching flap 156 to pivot away from the back panel 44 as shown in FIG. 6. During this cocking process, ears 154 extending laterally from latching member 144 preclude the upward movement of any of the slides 54, 56. This prevents someone from cheating the device by repeatedly withdrawing beverage cans while holding the knob of the coin receiving mechanism 30 in an intermediate position.

Once the rotatable portion of the coin receiving mechanism 30 has been sufficiently turned, the latching member 144 will have moved the latch plate 128 away from back panel 44 to a degree sufficient to allow latching flap notch 158 to engage back panel 44. With further rotation of the coin mechanism 30, springs 150 return latching member 144 to its "normal" position shown in FIG. 2, but the latch plate 128 remains in a cocked position as shown in FIG. 6. It should be noted that the vend cycle could be initiated by virtually anything. For the embodiment shown and described above, anything which would cock the latching plate 128 would be suitable, and it is not necessary that the vend cycle be dependent on or initiated by insertion of a predetermined coinage in mechanism 30.

With the ears 154 out of the way, any one of the slides 54, 56 can be raised by pivoting the corresponding lever 28*a–d* downward. For example, referring to FIGS. 2 and 8, when lever 28*c* is grasped and rotated downward, this causes cam surface 29 to force pin 118 and one entire upper slide 56 upward. Before pin 118 escapes slot 27 entirely, flap 108 aligns with and blocks the corresponding retention member extension 174. As the pin 118 is further raised, it eventually escapes slot 27, thus allowing door 26*c* to open. In fact, lower pin 116 forces the door 26*c* to open as the slide 56 is raised. The individual is then able to reach through the open door and take the beverage can which is available as shown in FIG. 7. Should the door slip before the can is completely withdrawn, flexible flap 170 will engage the can 31 to prevent it from completely rolling back into the delivery area so as to allow the door 26*c* to close. Thus, flap 170 ensures that the vending machine 20 will not cheat the consumer.

Of importance is the fact that flap 108 does not allow the individual to withdraw cans which are behind the rigid flap 168 from the inclined track 37 formed by the frame 35 (see FIG. 7). However, once the lever 28*c* and the door 26*c* are returned to their normal or locked positions as shown in FIG. 2, spring 64 causes an associates upper slide 56 to return to its normal position, pin 118 being drawn down into slot 27, thereby again locking door 26*c*. Spring 64 acts on slide 56, causing pin 118 to smoothly act in turn on cam surface 36, thus closing the door 26*c*. The top edge of upper slide 56 also uncocks latching flap 108 and latch plate 128 so that they can return to their normal positions, shown in FIG. 2, as the upper slide 56 is returned to its normal position by extension spring 64.

It should be stressed that the individual will not be able to open more than one door 26*a–d* during a given vend cycle. For example, as noted above, in order to open door 26*c* it is necessary to raise slide 56 using lever 28*c*. As upper slide 56 proceeds upward inclined surface 98 engages its corresponding pin 92 on upper/lower block pivot 90*b* to cause it to pivot to block the corresponding lower slide 54. At the same time, the upper catch 102 of upper slide 56 engages one of the ears 164 of left/right blocking pivot 162 to cause it to rotate toward and block the slides 54, 56 adjacent the other side of the mechanism 34. Thus it can be seen that the mechanism 34 provides a compact- and ingenious way to allow only one door 26*a–d* to be opened during a given vend cycle.

Once a can is withdrawn from one of the doors 26, and following closing of the door 26*a–d*, another can 31 will roll past freely pivoting retention member rigid flap 168 and into the delivery area immediately behind the door 26*a–d*.

It should be emphasized that the present invention is not limited to any particular components, materials or configurations, and modifications of the invention will be apparent to those skilled in the art in light of the foregoing description. This description is intended to provide specific examples of individual embodiments which clearly disclose the present invention. Accordingly, the invention is not limited to these embodiments or to the use of elements having the specific configurations and shapes as presented herein. For example, the various tracks or chutes of frame 35 could feed a common delivery area having a single tamper-proof delivery door, that being the technique employed by most rotating spiral dispensers. Put simply, all alternative modifications and variations of the present invention which fall within the spirit and broad scope of the appended claims are included.

I claim:

1. A mechanical vend unit for dispensing articles during a vend cycle, said apparatus comprising:

(a) a frame forming a plurality of inclined tracks suitable for storing the articles and for dividing the articles into a plurality of groups, the tracks having inlet ends and discharge ends;

(b) a lock-out mechanism operatively connected to the frame for selecting each of the groups of articles;

(c) a plurality of delivery doors operatively connected to the frame and to the lock-out mechanism, one each of the delivery doors in operative proximity to a discharge end of one of the inclined tracks; and (d) a plurality of retaining flaps pivotably connected to the frame, wherein the lock-out mechanism comprises:

(i) a plurality of elongate members operatively disposed relative to the doors and the retaining flaps; each elongate member being constructed and arranged for selective activation to unlock an associated delivery door and to maintain an associated delivery door locked until activation;

(ii) a latch plate operatively disposed relative to the elongate members having an unactivated state and an activated state;

(iii) a latching member operatively connected to the latch plate having a first position and a second position; and (iv) blocking pivots operatively disposed relative to the elongate members and constructed and arranged to selectively permit and inhibit activation of an associated elongate member, wherein when the latching member moves from its first position to its second position, and back to its first position, the latch plate is placed in its activated state, at which time the elongate members can be activated; wherein when one of the elongate members is activated the blocking pivots prevent activation of other elongate members; and wherein when the selected elongate member is activated its associated delivery door is unlocked to allow access to the selected group of articles, but pivoting motion of the associated retaining flap is prevented which permits withdrawal of only one article from the selected group.

2. The mechanical vend unit of claim 1, wherein the elongate members are slide members.

3. The mechanical vend unit of claim 2, wherein the lock-out mechanism comprises a plurality of cams, one each of the cams in operative contact with one each of the slide members wherein the slide members can be independently activated by rotation of the associated cams.

4. The mechanical vend unit of claim 2, wherein the lock-out mechanism further comprises a coin receiver mechanism in operative contact with the latching member, wherein when the appropriate coinage is deposited into the coin receiver mechanism and the mechanism is appropriately manipulated, the mechanism causes the latching member to move from its first position to its second position, and back to its first position.

5. A dispenser for dispensing articles during a vend cycle, said dispenser comprising:

(a) a refrigerator;

(b) a frame unit operatively positioned within the refrigerator forming four inclined tracks suitable for storing the articles and for dividing the articles into four groups, the tracks having inlet ends and discharge ends;

(c) a lock-out mechanism operatively connected to the frame for selectively each of the groups of articles; connected to the (d) four delivery doors operatively frame and to the lock-out mechanism, one each of the delivery doors in operative proximity to a discharge end of one of the inclined tracks; and (e) four retaining flaps pivotably connected to the frame, wherein the lock-out mechanism comprises:

(i) four slide members operatively disposed relative to the doors and the retaining flaps; each slide member being constructed and arranged for selective sliding movement, upon activation, to unlock an associated delivery door and to maintain an associated delivery door locked whenever inactivated; said lock-out mechanism including means for selection of a slide member to be activated;

(ii) a pivoting latch plate operatively disposed relative to the slide members having an uncocked position and a cocked position;

(iii) a spring-loaded latching member operatively connected to the latch plate having a first position and a second position; and (iv) one left/right and two upper/lower blocking pivots operatively disposed relative to the slide members and constructed and arranged to selectively permit and inhibit activation of an associated slide member, said lock-out mechanism including means; wherein when, during a vend cycle, the latching member moves from its first position to its second position and back to its first position, the latch plate is cocked, at which time the slide members can move; wherein when one of the slide members is activated and moved the blocking pivots prevent movement of the other slide members; and wherein when the activated slide member is moved its associated delivery door is unlocked to allow access to the selected group of articles, but pivoting motion of the associated retaining flap is prevented by the associated slide member, thus permitting only one article from the selected group to be withdrawn.

* * * * *